May 8, 1956  B. ZWICK  2,744,565
REVOLVABLE VEHICLE SEAT
Filed Jan. 3, 1952

Benjamin Zwick
INVENTOR.

BY
*Attorneys*

United States Patent Office 2,744,565
Patented May 8, 1956

2,744,565
REVOLVABLE VEHICLE SEAT
Benjamin Zwick, Knoxville, Tenn.

Application January 3, 1952, Serial No. 264,722

1 Claim. (Cl. 155—5)

This invention relates generally to a vehicle seat, and more specifically to a vehicle seat adapted to be utilized as the front seat of an automobile.

The primary object of this invention is to provide an improved vehicle seat for use as the front seat of an automobile, said vehicle seat having a cushion and a rotatable individual seat portion.

Another object of this invention is to provide a vehicle seat in which the driver's individual seat portion is rotatable with respect to the remainder of the seat.

Another object of this invention is to provide a vehicle seat with support means whereby a portion may be rotated with respect to the remainder of the seat.

A further object of this invention is to provide a vehicle seat for use as the front seat of an automobile, said seat having an opening in the cushion thereof, and an individual seat portion rotatably received in said portion, said individual seat portion also forming the left front corner of the vehicle seat.

These, together with various ancillary features and objects of the invention which will later become apparent as the following description proceeds, are attained by the present invention, a preferred embodiment of which has been illustrated by way of example only in the accompanying drawings, wherein.

It is well known that in order to be seated in proper relation with respect to the controls of an automobile, it is necessary to place the front seat closely adjacent the steering wheel of an automobile. However, the arrangement of the seat with respect to the steering wheel results in a narrow space through which the driver must pass in order to get in and out of the driver's portion of the seat. In sliding in and out of the seat, both the corner of the seat and the seat of the driver's clothing is worn. Furthermore, quite often the vehicle seat is worn to a point where the corner springs or other metal portions project through the fabric of the seat and tears the clothing of one sliding across the corner of the seat.

Figure 1:
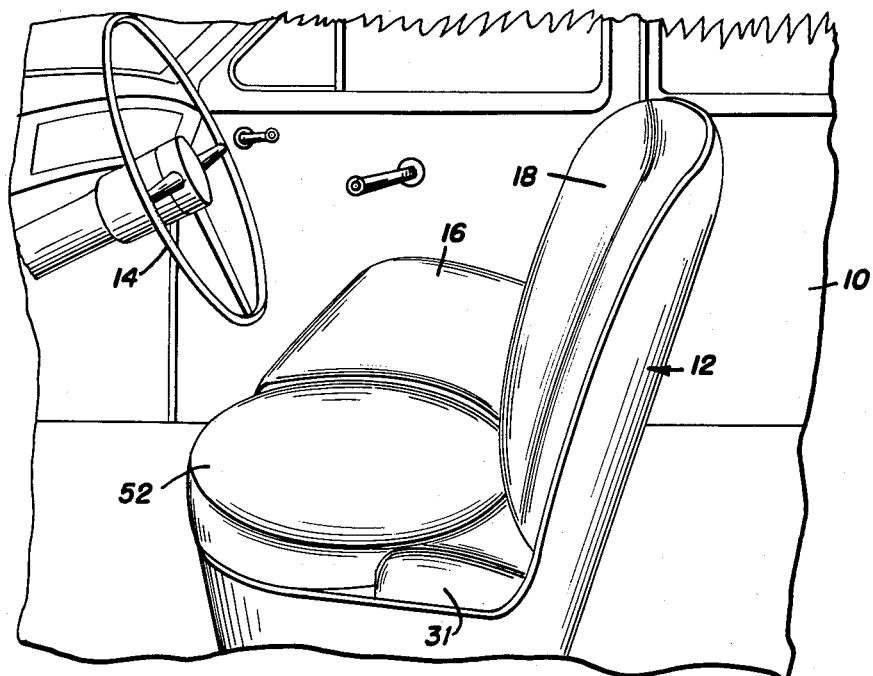
Figure 1 is a partial perspective view of the improved seat which is the subject of this invention, and showing the improved vehicle seat being used as the front seat of an automobile.

Referring now more specifically to the accompanying drawings, wherein like numerals designate similar parts throughout the various views, it will be seen that the novel vehicle seat of this invention is shown in Figure 1 as being used as the front seat of a conventional automobile 10. The improved vehicle seat, which forms the subject of this invention, will be referred to hereinafter by the reference numeral 12. The vehicle seat 12 is positioned closely adjacent the steering wheel 14 of the automobile 10.

Figure 2:
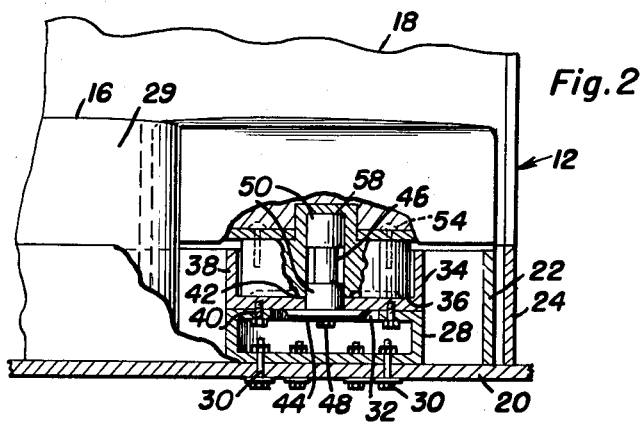
Figure 2 is an enlarged partial front elevational view of the seat of Figure 1, parts being broken away and shown in section in order to show the means for supporting the individual seat portion with respect to the remainder of the seat.
Figure 3:
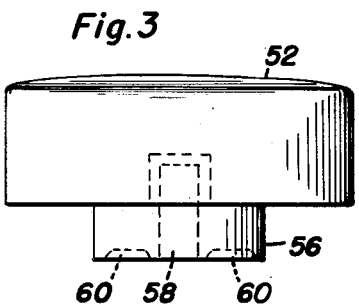
Figure 3 is a front elevational view of the individual seat portion showing the individual seat portion removed from the vehicle seat.
Figure 4:
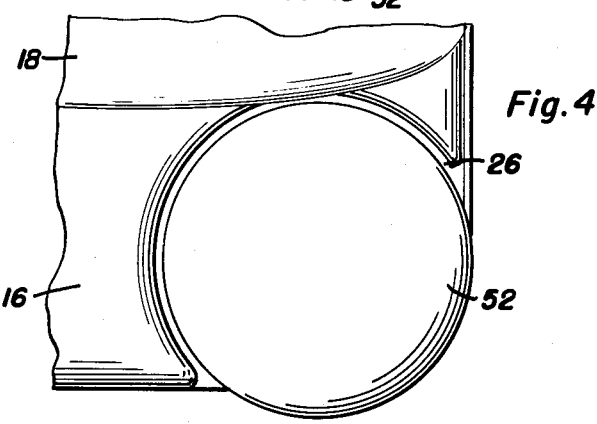
Figure 4 is an enlarged partial top plan view of the vehicle seat, which is the subject of this invention, and showing the manner in which the cushion of the seat is cut away to provide an opening in which is positioned the individual seat portion.

Referring now to Figures 1 and 2 in particular, it will be seen that the vehicle seat 12 includes a cushion 16 and back rest 18. The cushion 16 and the back rest 18 are carried by a main frame member 20 of the vehicle seat 12. Extending upwardly from the main frame 20 are frame elements 22 and 24 which support the cushion 16 and the back rest 18, respectively. The cushion 16 is provided on the driver's side with an opening 26 which intersects the front 29 and side 31 of the cushion 16. The cushion 16 bounds the opening 26 to a substantially semi-circular arc, and the remainder of the opening 26 is bounded by the corner of the seat.

Referring now to Figure 2 in particular, it will be seen that secured to the main frame 20 of the seat 12 and disposed within the opening 26 is a hollow spacer member 28. The hollow spacer member 28 is secured to the main frame 20 of the seat 12 by a plurality of fasteners 30 which extend through both the main frame 20 and part of the spacer 28. The upper surface of the hollow spacer 28 is provided with a large centrally located aperture 32. Overlying and secured to the hollow spacer 28 is a cup-shaped guide member 34, the guide member 34 having a circular bottom wall 36 and a cylindrical side wall 38. The bottom portion 36 of the guide 34 is secured to the upper portion of the hollow spacer member 28 by a plurality of fasteners 40.

The bottom wall 36 of the guide 34 is provided with a centrally located opening 42, and a plate 44 is welded to the underside of the bottom 36 and underlying the opening 42. A spindle 46 is secured within the guide 34 by a fastener 48 passing through the plate 44 and into the end of the spindle 46. The spindle 46 is provided with enlarged upper and lower bearing surfaces 50, the lower bearing surface 50 being engaged within the opening 42 for alignment with respect to the guide 34.

Secured within the opening 26 in the cushion 16 is a rotatable individual seat portion 52 which is substantially cylindrical. Secured to the bottom of the individual seat portion 52 by fasteners 54 is a circular bearing member 56. The bearing member 56 is provided with a centrally located vertical bore 58 in which is received the spindle 48 with the enlarged upper and lower bearing engaging portions 50 in engagement with the sides of the bore 58. The bottom of the bearing 56 engages the upper surface of the bottom 36 of the guide 34, and the weight of the individual seat portion 52 is transmitted through the bottom 36 to the main frame 20. The bottom of the bearing 56 is relieved in order to reduce the bearing surface area, and also to form a plurality of grease retaining pockets 60.

From the foregoing, it will be readily apparent that the seat 12 is freely rotatable through an angle of 360°. Also, due to the circular configuration of the seat 12, the seat remains in a normal driver-supporting position.

Referring now to Figure 1, it will be seen that when the driver of the automobile 10 proceeds to slide between the steering wheel 14 and the seat 12, that he will engage the individual seat portion 52, and that the same will rotate in response to the sliding motion of the driver. Since the individual seat portion 52 rotates with the movement of the driver, it is obvious that the friction between the seat of the driver's clothing and the seat 12 is greatly reduced, and consequently the life of both the seat 12 and the driver's clothing is greatly lengthened. Furthermore, since the individual seat portion 52 now forms the corner of the seat 12, the corner forming portion is gradually rotated around so that no one portion of the seat 12 receives all of the wearing engagement as in the case of a rigid corner construction. It is, therefore, obvious that the corner of the seat 12 will not wear out before the remainder of the cushion 16.

From the foregoing, the construction and operation of the vehicle seat will be readily understood, and further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

An automobile seat comprising a cushion and a back rest, said cushion being provided with an opening therein, said opening extending inwardly of the cushion from the front edge and one side edge thereof, a cylindrical individual seat portion disposed within said opening, a spindle carried by the frame of the seat, said individual seat portion having a bearing member with a vertical bore therein mounted on said spindle, said spindle extending within a guide member supported on said frame, said guide member rotatably receiving said bearing therein.

References Cited in the file of this patent

UNITED STATES PATENTS

| | | | |
|---|---|---|---|
| 84,871 | Fisk et al. | Dec. 15, | 1868 |
| 657,875 | Johnson | Sept. 11, | 1900 |
| 1,774,950 | Squires | Sept. 2, | 1930 |
| 2,347,753 | Sengpiel | May 2, | 1944 |
| 2,576,004 | Fair | Nov. 20, | 1951 |